May 7, 1963 R. C. ULM 3,088,622
STORAGE VESSEL
Filed Feb. 23, 1961 2 Sheets-Sheet 1
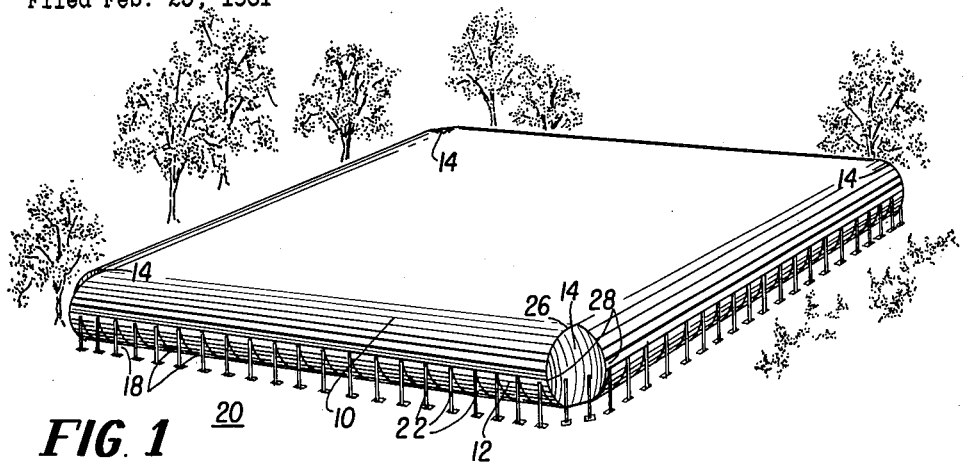
FIG. 1
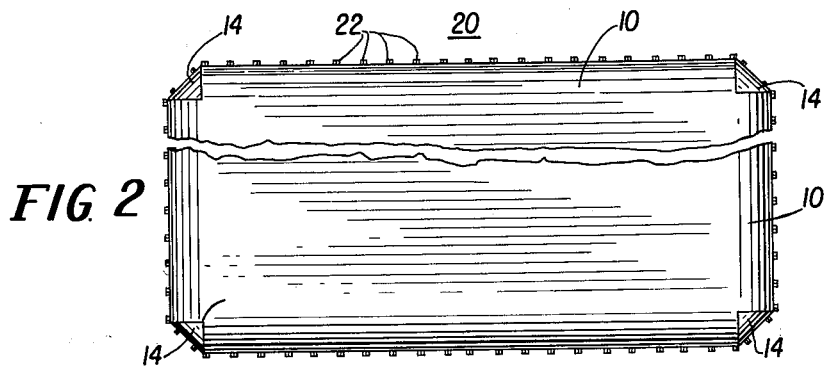
FIG. 2
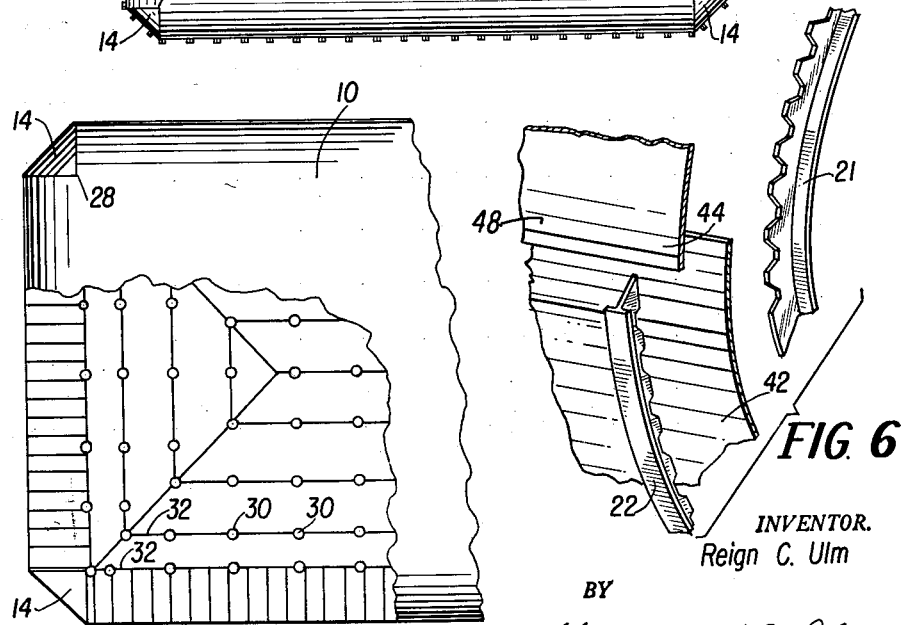
FIG. 3
FIG. 6
INVENTOR.
Reign C. Ulm
BY
Byron, Hume, Groen, & Clement
ATTYS.

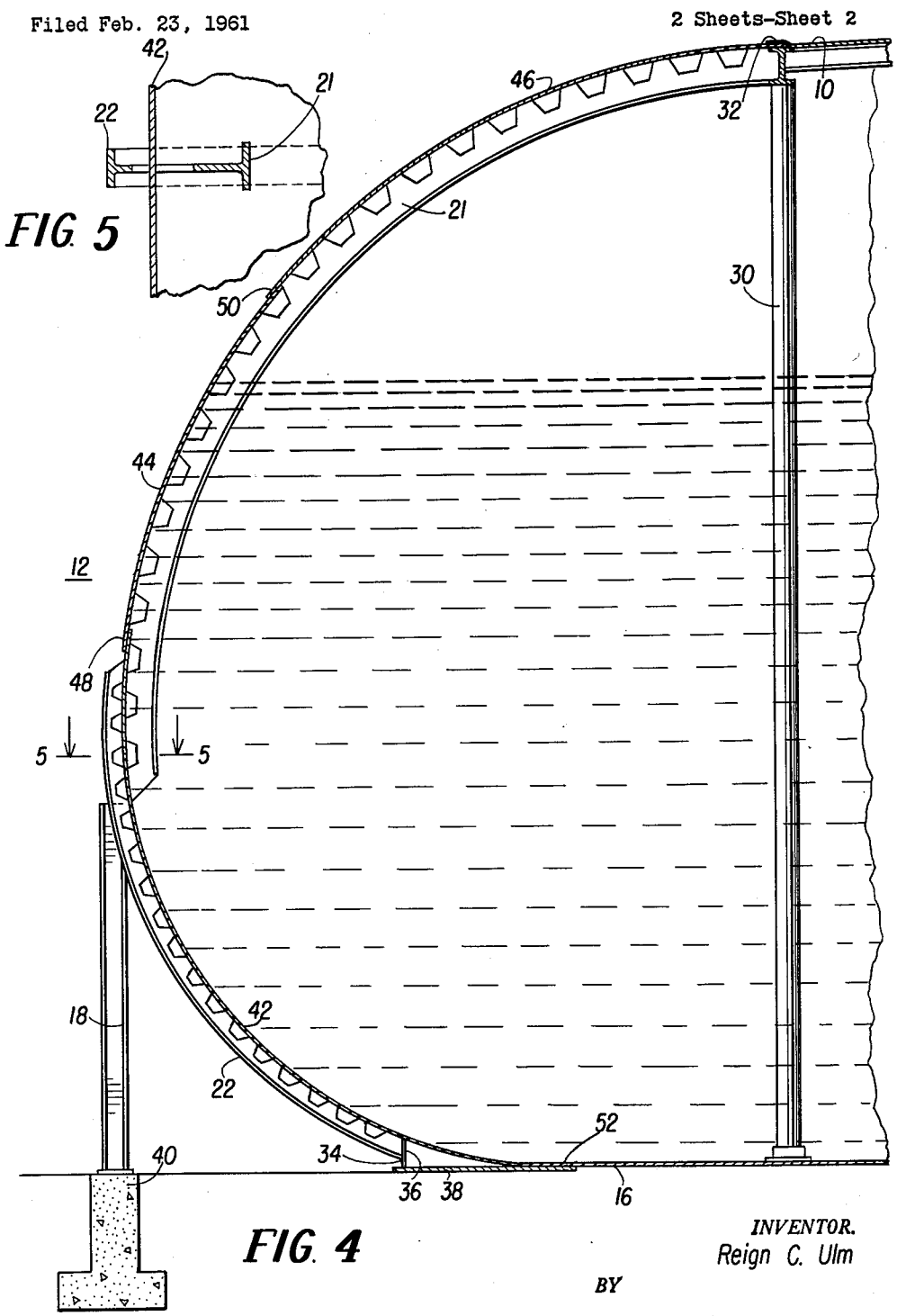

United States Patent Office 3,088,622
Patented May 7, 1963

3,088,622
STORAGE VESSEL
Reign C. Ulm, Schererville, Ind., assignor to Union Tank Car Company, Chicago, Ill., a corporation of New Jersey
Filed Feb. 23, 1961, Ser. No. 91,121
2 Claims. (Cl. 220—18)

The present invention relates to storage vessels and, in particular, to storage tanks for storing liquid products.

It is an object of the present invention to provide a new and improved storage vessel.

It is another object of the present invention to provide in a storage vessel a new and improved corner construction.

It is a further object of the present invention to provide in a storage vessel a new and improved wall construction.

It is yet a further object of the present invention to provide a new and improved low cost storage vessel which can be quickly and easily assembled.

The above and other objects are realized in accordance with the present invention by providing a new and improved storage vessel. Briefly, the storage vessel is an enclosed container and embodies a floor adapted to be suitably supported from the ground or the like. It also includes a roof spaced from the floor by curvilinear wall sections. Additional curvilinear sections are embodied at each of four corners of the tank and interconnect the adjacent sides, the roof, and the floor of the tank, thereby to provide a tank having corner sections extending at an angle with respect to the intersecting walls. In order to add rigidity to the walls and prevent wall deformation when the tank is storing a liquid product, a unique wall structure is provided. Additional supporting means are also provided for the roof and wall sections to impart strength to the storage vessel.

The invention, both as to its organization and method of operation, will best be understood by reference to the following description taken in connection with the accompanying drawings, in which:

FIGURE 1 is a perspective view illustrating a storage tank embodying the features of the invention;

FIGURE 2 is a plan view of the tank of FIGURE 1;

FIGURE 3 is a fragmentary, schematic view of the tank illustrated in FIGURE 1;

FIGURE 4 is a fragmentary cross-sectional view illustrating the wall section of the tank illustrated in FIGURE 1;

FIGURE 5 is a fragmentary cross-sectional view taken along the line 5—5 of FIGURE 4; and FIGURE 6 is a fragmentary exploded view illustrating in some detail a portion of the upper and lower wall sections of the tank illustrated in FIGURE 1.

Referring now to the drawings, and especially to FIGURE 1, a storage tank 20 is illustrated embodying the features of the invention. Inasmuch as the storage tank 20 is low in height, it is possible to screen it easily with trees and landscaping in residential areas. Also, the storage tank 20, which is substantially rectangular in plan, is most desirable because it can be built to make full use of standard ground plots.

The storage tank 20 comprises a flat roof 10 and a flat bottom 16. Interconnecting the flat roof 10 and the flat bottom 16 are the side walls 12. Interconnecting the flat roof portion 10, the flat bottom 16 and the intersecting side walls 12 are the corner sections 14.

The side walls 12 are composed of segments of cylinders having their main axes askew to the main axis of the intersecting corner sections 14 and, in the illustrated embodiment of the invention, the main axes of the intersecting side walls 12 are at approximately 45° with respect to the main axes of the corner sections 14. The corner sections 14 are also composed of segmental cylinder portions. The side walls 12 and corner sections 14 are not composed of segmental portions of a single cylinder but are composed of segmental portions of two cylinders having different diameters, as will be more fully explained later.

The side walls 12 intersect the roof 10 and the bottom 16 tangentially, as can be seen in the drawings, and hence, no vertical force exists between the side walls 12 and the roof 10 and bottom 16 at their juncture points.

A plurality of supporting beams 18 are anchored adjacent the side walls 12 of the storage tank 20 and are secured to the side walls 12 of the storage tank 20 to help support the side walls 12 and to prevent deformation of the side walls 12.

Referring now particularly to FIGURE 4, the side walls 12 are composed of a plurality of upper wall support serrated arcuate T-beams 21 and a plurality of lower wall support serrated arcuate T-beams 22. The radius of curvature of the lower wall support T-beams 22 of the walls 12 is less than the radius of curvature of the plurality of upper wall support T-beams 21 of the walls 12, in order to add rigidity to the walls and prevent wall deformation when the storage tank contains a liquid to be stored. Weight reduction is obtained by stressing both the roof 10 and the bottom 16 of the storage tank 20 and by designing the walls 12 of the storage tank 20 similar to that of a dam.

Referring to FIGURES 1 through 3, the segments of the cylinders comprising the corner portions 14 taper from a point 26 adjacent the top 10 of the storage tank 20 outwardly until it reaches a maximum across line 28. Line 28 is approximately half-way between the roof 10 and bottom 16 of the storage tank 20. Line 28 is not exactly half-way between the roof 10 and bottom 16 of the storage tank 20 due to the fact that the upper support serrated arcuate T-beams 21 and the lower support serrated arcuate T-beams 22 of the walls 12 have different radii of curvature. The segments of the cylinders comprising the corner sections 14 then taper inwardly from line 28 to the skirt portion 34 adjacent the bottom portion of the storage tank 20, as will be explained.

A skirt portion 34 comprising plates 36 and 38 orientated at right angles with one another is welded to the bottom 16 of the storage tank 20 as best seen in FIGURE 4 and the skirt portion 34 extends completely around the storage tank 20. The main purpose of the skirt portion 34 is to distribute the weight of the storage tank 20 and its contents over a greater foundational area. The skirt portion 34 also helps to prevent rust from forming at the extreme lower portion of the side walls 12 and corner portions 14 adjacent the bottom 16 of the storage tank 20. The skirt portion 34 in the corner portions 14 will lie on an approximately 45° line with respect to the skirt portion 34 in the intersecting sides.

A plurality of columns 30 extend from the roof 10 to the bottom 16 of the storage tank 20 and are regularly spaced and orientated, as best indicated diagrammatically in FIGURE 3. A plurality of rafter I-beams 32 are attached to the columns 30 at the upper end thereof and to one another in a pattern diagrammatically illustrated in FIGURE 3.

*Assembly*

Initially, a suitable site is chosen for the storage tank 20 and the land cleared and leveled. Next, the protective skirt portion 34, comprising two plates 36 and 38, welded at right angles to one another, is laid out extending completely around what is to be the bottom periphery of the storage tank 20 and joined to one another at the intersecting corner portions 14. The bottom 16 is then formed by welding plates one to the other until the area described by the protective skirt 34 is completely covered and the steel plates forming the bottom 16 are then lap-welded to the horizontal plate 38 of the protective skirt 34.

Next, the foundation 40 best seen in FIGURE 4, for the supporting beams 18, is poured and the foundation 40 extends completely around the periphery of the storage tank 20 and the supporting beams 18 are then securely fastened to the foundation 40 by any convenient means. Next, the plurality of bottom support serrated arcuate T-beams 22 are secured in place by welding one end thereof to the protective skirt 34, as best seen in FIGURE 4, and by welding the other end thereof to the upper portion of the supporting beams 18.

The outer walls 12 are then partially assembled. The outer walls 12 in the illustrated embodiment of the invention are comprised of three pieces, 42, 44 and 46, welded to one another at 48 and 50, respectively. The bottom piece 42 is butt-welded at 52 to the bottom 16 of the storage tank 20 and further welded to the serrated lower T-beams 22 all along the tooth faces of the serrated T-beams 22.

Next, the columns 30 are secured to the bottom 16 by welding or the like and arranged in a pattern as diagrammatically illustrated in FIGURE 3. The interconnecting I-beams 32 are then extended through the columns 30 pattern to form the interlaced roof supporting structure diagrammatically illustrated in FIGURE 3.

At this time, the serrated upper wall support T-beams 21 are secured to the rafter I-beams 32 and thereafter welded to the bottom piece 42 along the tooth faces of the serrated T-beams 21. Next, the intermediate pieces 44 of the outer walls 12 are welded at 48 to the bottom pieces 42 of the outer walls 12 and then welded to the serrated teeth of the upper wall support serrated T-beams 21.

The top or third pieces 46 of the outer walls 12 are then welded at 50 to the intermediate pieces 44 of the outer walls 12 and to the tooth faces of the serrated T-beams 21. Finally, the roof 10 is assembled by welding plates one to the other, the peripheral plates are then lap-welded to the top pieces 46 of the outer walls 12, as seen in FIGURE 4.

As can be easily seen at this point, one of the purposes of positioning the lower wall support serrated T-beams 22 and the upper wall support serrated T-beams 21 on the outside and inside, respectively, of the side walls 12 is to provide a gravity cradle for the three pieces 42, 44 and 46, comprising the side walls 12 during assembly of the side walls 12. It should be noted that the lower piece 42 is easily positioned while being welded in place because the lower piece 42 rests on the lower wall support serrated T-beams 22. In addition, the intermediate piece 44 and the upper piece 46, rest on the T-beams 21 and therefore are easier to hold in place while being welded, as previously described.

The lower serrated wall support T-beams 22, the upper serrated wall support T-beams 21, the three wall covering pieces 42, 44 and 46, of the outer walls 12, as well as the support beams 18, the vertical support columns 30, the rafter I-beams 32 and the roof 10 and bottom 16 of the storage tank 20, are assembled straightforwardly until all that remains to be assembled is the corner portions 14.

The corner portions 14 are composed of segmental portions of two cylinders having different diameters and the upper portion of the corner portions 14 is of a different radius of curvature than the lower portions of the corner portions 14. One of the advantages of the corner portions 14 is the reduction of the cost of construction of the storage tank 20. Assume for example, that the corner portions 14 were not provided and the side walls 12 were allowed to intersect. A substantially 90° angle corner would be provided and one seam, or joint, would exist on each corner. The natural tendency of the liquid in the storage tank would tend to cause the corner sections, or portions, to form into a spherical section. This could not occur, and therefore, a great buckling tendency would be applied to the 90° angle, or right angle corners. While the corner portions could be formed into spherical sections, the cost of the spherical sections would be relatively high, and therefore, such a spherical construction would be impractical. It is less expensive to generate a surface of a cylinder than it is to generate a surface of, for example, a sphere. At the same time, the buckling problems relating to the right angled corners, are reduced with the use of the corner portions 14. The corner portions 14 may be assembled much as the rest of the vessel 20, however, if more than one each serrated wall support T-beams 21 and 22 are desired in the corner portions 14, the upper portion of upper serrated wall support T-beams 21 will not be able to extend completely to the rafter I-beams 32 and will have to be extended by additional angulated welded beams.

When liquid is deposited in the storage tank 20, the tendency of the side walls 12 of the vessel 20 is to deform outwardly. Inasmuch as the lower portion of the walls 12 has already been deformed, so as to speak, the resistance to further deformation is substantial. Also, inasmuch as both the roof 10 and the bottom 16 of the storage tank 20 are both in tension because of the construction of the vessel 20, both aid in maintaining the shape of the side walls 12. Therefore, lighter material may be used in the construction of the upper serrated support beams 21 and the lower serrated wall support beams 22 as well as in the pieces forming the outer walls 12.

While an embodiment described herein is at present considered to be preferred, it is understood that various modifications and improvements may be made therein, and it is intended to cover in the appended claims all such modifications and improvements as fall within the true spirit and scope of the invention.

What is claimed in the United States Letters Patent is:

1. A vessel for storing liquid comprising an enclosed container substantially rectangular in plan, said container including a substantially flat roof and a substantially flat bottom interconnected by substantially rigid side walls and substantially rigid corners, each of said side walls having a generally curvilinear configuration provided with substantially vertical side edges joined at their upper and lower ends to the roof and bottom, respectively, the configuration of the side walls being such that the walls tangentially intersect said roof and bottom, respectively, the adjacent vertical side edges of adjacent side walls lying in planes that are substantially right angularly related to each other, each of said corners having a generally curvilinear configuration, similar to the above configuration, and joining the adjacent side edges of adjacent side walls, the horizontal sections of said corners being substantially straight, the configuration of the corners being such that their upper portions and lower portions are progressively narrower than their middle sections, whereby the stresses developed in the corners and the adjacent portions of the side walls are substantially less than in a vessel provided only with intersecting side walls and no corners.

2. A vessel for storing liquid comprising an enclosed container substantially rectangular in plan, said container including a substantially flat roof and a substantially flat bottom interconnected by substantially rigid side walls and substantially rigid corners, each of said side walls having a generally curvilinear configuration provided with substantially vertical side edges joined at their upper and lower ends to the roof and bottom, respectively, the configuration of the side walls being such that the walls tangentially intersect said roof and bottom, respectively, the adjacent vertical side edges of adjacent side walls lying in planes that are substantially right angularly related to each other, each of said corners being a generally curvilinear configuration similar to the above configuration, and joining the adjacent side edges of adjacent side walls, the horizontal sections of said corners being substantially straight, said side walls and corners adjacent the bottom of the container having a substantially constant radius of curvature less than the substantially constant radius of curvature of the portion of the side walls and corners adjacent the roof, whereby the configuration of the side walls and corners is substantially that which the walls and corners would assume under load.

References Cited in the file of this patent

UNITED STATES PATENTS

| | | |
|---|---|---|
| 2,119,518 | Boardman | June 7, 1938 |
| 2,380,089 | Ulm | July 10, 1945 |
| 2,673,001 | Ulm | Mar. 23, 1954 |
| 2,963,191 | Setzekorn | Dec. 6, 1960 |

FOREIGN PATENTS

| | | |
|---|---|---|
| 460,660 | Canada | Nov. 1, 1949 |